United States Patent
Gurvich et al.

(10) Patent No.: US 12,181,098 B2
(45) Date of Patent: Dec. 31, 2024

(54) COMPOSITE FRAMES FOR OPTO-MECHANICAL SUPPORT STRUCTURES

(71) Applicant: Goodrich Corporation, Charlotte, NC (US)

(72) Inventors: Mark R. Gurvich, Middletown, CT (US); Brian J. Smith, Maynard, MA (US)

(73) Assignee: GOODRICH CORPORATION, Charlotte, NC (US)

( * ) Notice: Subject to any disclaimer, the term of this patent is extended or adjusted under 35 U.S.C. 154(b) by 283 days.

(21) Appl. No.: 17/679,489

(22) Filed: Feb. 24, 2022

(65) Prior Publication Data

US 2023/0265964 A1    Aug. 24, 2023

(51) Int. Cl.
| | | |
|---|---|---|
| *F16M 11/00* | (2006.01) | |
| *B29C 70/38* | (2006.01) | |
| *F16M 11/12* | (2006.01) | |
| *B29L 12/00* | (2006.01) | |
| *G02B 7/00* | (2021.01) | |

(52) U.S. Cl.
CPC ........... *F16M 11/12* (2013.01); *B29C 70/382* (2013.01); *B29L 2012/00* (2013.01); *G02B 7/00* (2013.01)

(58) Field of Classification Search
None
See application file for complete search history.

(56) References Cited

U.S. PATENT DOCUMENTS

| | | | | |
|---|---|---|---|---|
| 4,690,960 | A * | 9/1987 | Yamauchi | F16F 9/306 |
| | | | | 523/513 |
| 4,899,323 | A * | 2/1990 | Fukahori | E04B 1/36 |
| | | | | 248/560 |
| 5,993,941 | A * | 11/1999 | Vasiliev | B32B 3/12 |
| | | | | 428/116 |
| 8,136,782 | B2 * | 3/2012 | Rowland | F16M 11/22 |
| | | | | 248/910 |
| 9,395,604 | B1 * | 7/2016 | Fanska | G03B 17/561 |
| 10,654,246 | B2 | 5/2020 | Xie et al. | |
| 2007/0145633 | A1 | 6/2007 | Oi et al. | |

(Continued)

FOREIGN PATENT DOCUMENTS

| | | | | |
|---|---|---|---|---|
| WO | WO-2004011169 A2 * | 2/2004 | | B29C 70/342 |
| WO | 2020/32663 A1 | 2/2020 | | |
| WO | 2020132663 A1 | 6/2020 | | |

OTHER PUBLICATIONS

Extended European Search Report dated Jul. 14, 2023, issued during the prosecution of European Patent Application No. EP 23157403.9.

(Continued)

*Primary Examiner* — Steven M Marsh
(74) *Attorney, Agent, or Firm* — CANTOR COLBURN LLP

(57) ABSTRACT

A frame for an opto-mechanical support structure includes an interconnected lattice of frame composite rods defined about an interior space with interstices defined between the frame composite rods. A method of making an opto-mechanical frame includes forming a frame of interconnected lattice of frame composite rods using one or more Automated Fiber Placement (AFP) around a mandrel. The method includes removing the mandrel from an interior space of the frame after forming the frame.

13 Claims, 10 Drawing Sheets

(56) References Cited

U.S. PATENT DOCUMENTS

| | | |
|---|---|---|
| 2013/0337207 A1 | 12/2013 | Mueller et al. |
| 2017/0087745 A1 | 3/2017 | Cawthorne |
| 2020/0326178 A1* | 10/2020 | Schafer ................. F16B 1/00 |
| 2021/0206135 A1 | 7/2021 | Webb |
| 2023/0366421 A1* | 11/2023 | Gurvich ................. G02B 7/00 |

OTHER PUBLICATIONS

Belnoue et al. "Understanding and predicting defect formation in automated fibre placement pre-preg laminates" Composites Part A: Applied Science and Manufacturing 102 (Nov. 2017) pp. 196-206.

* cited by examiner

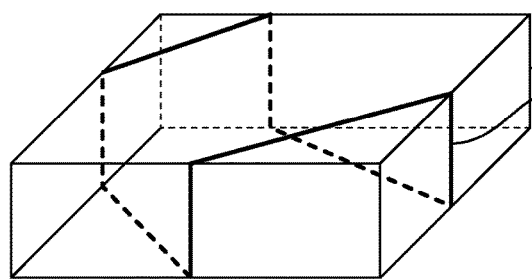
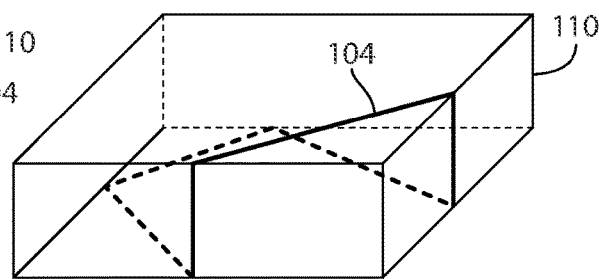
*Fig. 2b*  *Fig. 2c*
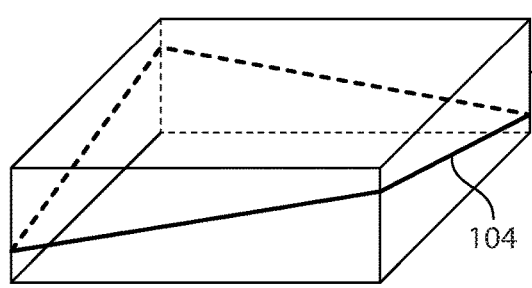
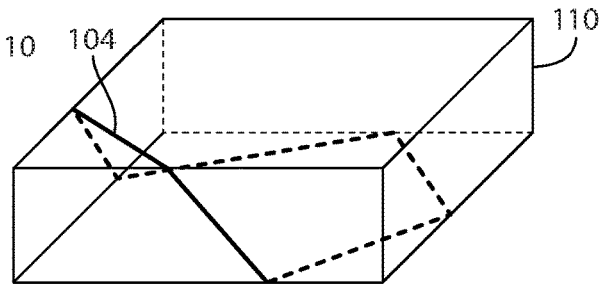
*Fig. 2d*  *Fig. 2e*

COMPOSITE FRAMES FOR OPTO-MECHANICAL SUPPORT STRUCTURES

BACKGROUND

1. Field

The present disclosure relates to opto-mechanical support structures, and more particularly to opto-mechanical support structures with frames of fiber-reinforced composite materials.

2. Description of Related Art

Existing opto-mechanical support structures for optics and mechanical systems such as cameras and like imaging or information transmission systems are metallic based on shell designs with supportive ribs. Substitution of metal by fiber-reinforced polymer-matrix composites provides significant advantages such as lighter weight, corrosion resistance, durability, vibrational damping and more reliable supply chain availability without in advance ordering. Current composite structures usually mimic the existing metallic shell-based designs. However, current composite shell-based designs are limited by, among other things, relatively low stiffness and low strength properties in non-fiber orientations (transversal, shear, interlaminar) requiring their thickness increase with associated extra weight, complexity and cost of fabrication requiring considerable manual labor, additional risk of damage, especially in shell/ribs connections, and expensive quality/service control.

The conventional techniques have been considered satisfactory for their intended purpose. However, there is an ever-present need for improved systems and methods for improved composite components for optics support structures with potential for both design and manufacturing improvement/optimization. This disclosure provides a solution for this need.

SUMMARY

A frame for an opto-mechanical support structure includes an interconnected lattice of frame composite rods defined about an interior space with interstices defined between the frame composite rods.

The lattice of frame composite rods can include a plurality of continuous loop frame composite rods interconnected with the lattice. The lattice of frame composite rods can include a plurality of dis-continuous loop frame composite rods interconnected with the lattice. The frame composite rods can be unidirectionally fiber-reinforced composite elements, e.g. composite tapes or combination of such tapes. Intersections of the frame composite rods can include interlaying of the composite element layers of the respective intersecting frame composite rods.

At least one of the frame composite rods can include a cross-sectional profile selected from the group consisting of: constant thickness, non-constant thickness where one surface of the cross-sectional profile is flat, non-constant thickness where opposed surfaces are both not flat, one rib extending from a base, multiple ribs extending from an external surface, a hollow shape, a hollow shape with an insert inside, multiple different materials in layers varied through thickness of the cross-sectional profile, and multiple different materials in layers varied through thickness and width of the cross-sectional profile.

One of the interstices can define an opto-mechanical aperture therethrough for admittance of optics image data through the lattice and frame. Wall panels can be mounted to an exterior aspect of the lattice for protection of the interior space. At least one of the wall panels can include an aperture therethrough, aligned with the optical aperture of the lattice. An opto-mechanical assembly can be mounted inside the lattice and frame with an objective lens aligned with an optics aperture through one of the interstices in the lattice.

At least one of the frame composite rods can form a continuous loop that extends across more than one surface of the interior space. The interior space can be six-sided and wherein at least one of the frame composite rods forms a continuous loop that extends across all six sides of the interior space. The interior space can be six-sided and wherein at least one of the frame composite rods forms a continuous loop that extends across three different sides of the interior space. The interior space can be six-sided and wherein at least one of the frame composite rods forms a continuous loop that extends across four different sides of the interior space. Two or more frames as described above can be connected together as a three-dimensional gimbal.

A method of making an opto-mechanical frame includes forming a frame of interconnected lattice of frame composite rods using one or more fabrication processes by Automated Fiber Placement (AFP) technique around a mandrel. The method includes removing the mandrel from an interior space of the frame after forming the frame.

The method can include removing the mandrel by dissolving or washing the mandrel away after forming the frame. Forming the frame can include using at least one AFP arm to articulate fibers around the mandrel relative to a fixed frame of reference. Forming the frame can include rotating the mandrel relative to the fixed frame of reference. Forming the frame can include forming interlayered intersections of the frame composite rods in the lattice on a one-layer-at-a-time basis.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIGS. 2*a*-2*e* are schematic perspective views of frame composite rods, showing representative continuous loop frame composite rods crossing different numbers of sides of the mandrel on an exemplary six-sided internal space;

DETAILED DESCRIPTION OF THE PREFERRED EMBODIMENTS

Figure 1:
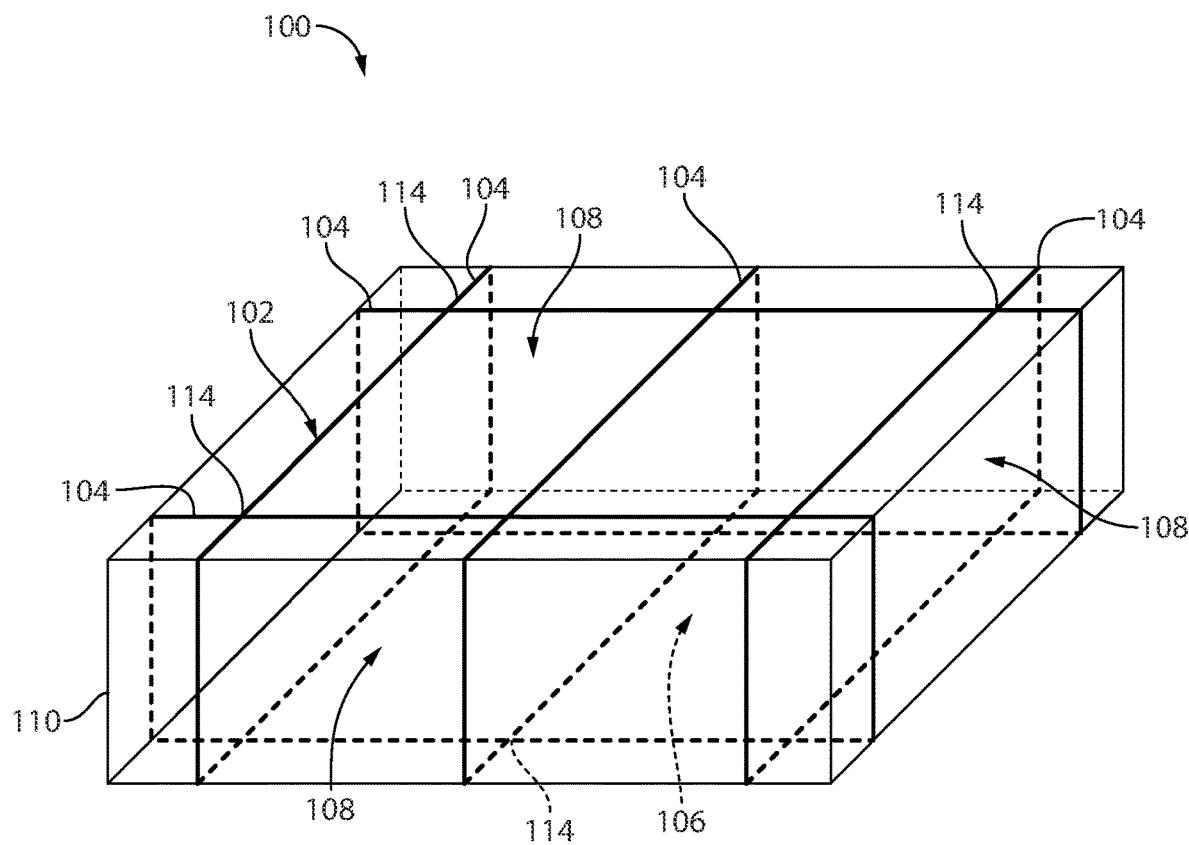
FIG. 1 is a schematic perspective view of an embodiment of a composite frame constructed in accordance with the present disclosure, showing the frame composite rods and interstices.

Reference will now be made to the drawings wherein like reference numerals identify similar structural features or aspects of the subject disclosure. For purposes of explanation and illustration, and not limitation, a partial view of an embodiment of a frame in accordance with the disclosure is shown in FIG. 1 and is designated generally by reference character 100. Other embodiments of systems in accordance with the disclosure, or aspects thereof, are provided in FIGS. 2-9, as will be described. The systems and methods described herein can be used to form composite frames for optics or opto-mechanical systems.

The frame 100 for an optical or other equipment support structure includes an interconnected lattice 102 of frame composite rods 104 defined about an interior space 106 with interstices 108 defined between the frame composite rods 104. In FIG. 1, not all of the interstices 108 are labeled for sake of clarity. Also shown in FIG. 1 is the mandrel 110 about which the frame composite rods 104 are formed. FIG. 1 shows the beginning of a frame structure, to which additional frame composite rods 104 can be added to form a complete frame 100, for example as shown in FIG. 3.

Figure 2A:
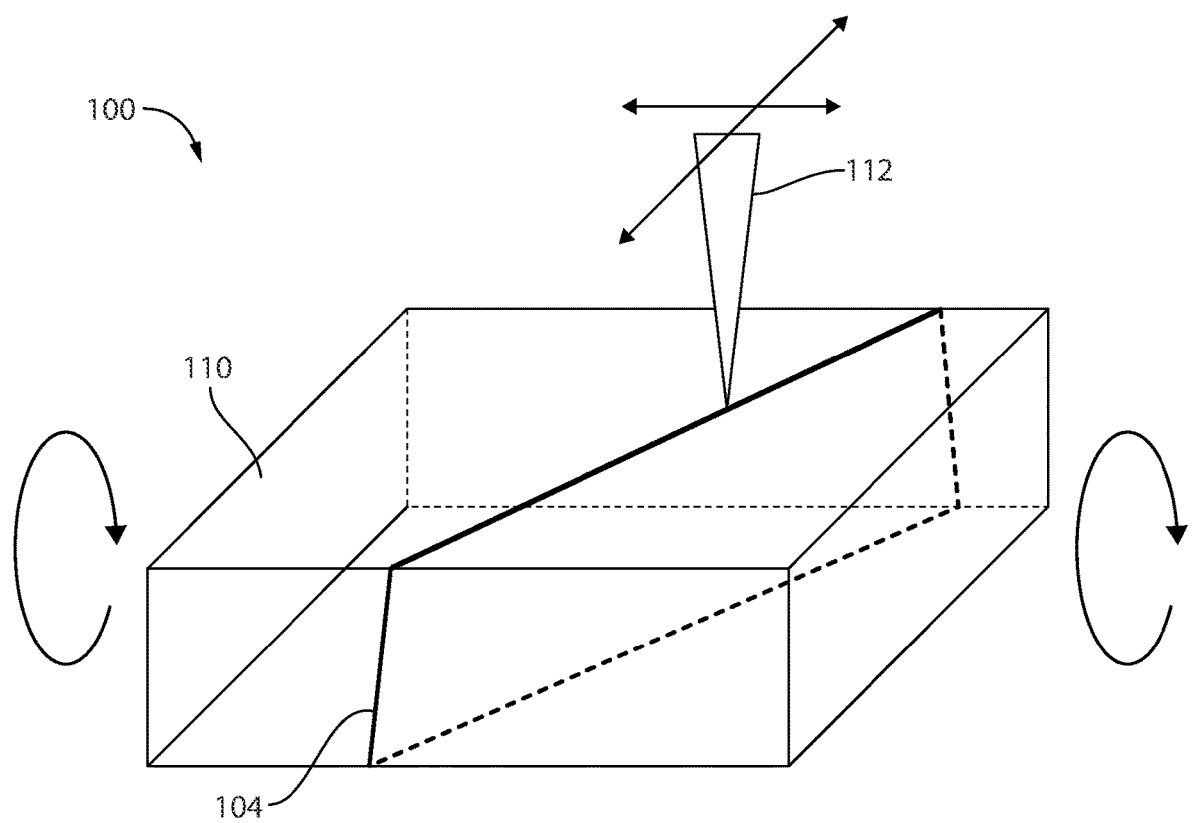

FIG. 2a shows another beginning stage for forming a frame 100, with an Automated Fiber Placement (AFP) arm 112 forming a continuous, i.e., closed loop frame composite rod 104 about the mandrel 110. The double arrows in FIG. 2a schematically indicate examples of movement orientations of the AFP arm 112, e.g., relative to a stationary frame of reference, that can be used form forming the frame composite rods 104. In other embodiments, using advanced AFP capabilities, the AFP arm 112 can move in all three space directions and similarly rotate in all three angular orientations. The circular arrows in FIG. 2a schematically indicate examples of the movement or rotation of the mandrel 110 itself, relative to the same stationary frame of reference, which can also be used for forming the frame composite rods 104. Depending on the specifics of AFP implementation, the mandrel 110 can move and/or rotate in different directions and orientations. In this example, the frame composite rod 104 in FIG. 2a forms a continuous, i.e., closed, loop on itself and crosses over four faces of the 6-sided mandrel (and corresponding interior space 106, see FIG. 1), e.g., the top, front, bottom, and back surfaces as oriented in FIG. 2a.

FIG. 2b shows another frame continuous, i.e., closed, loop forming a frame composite rod 104 that crosses all six surfaces of the mandrel (and corresponding interior space 106, see FIG. 1), and crosses each of the top and bottom surfaces twice), as oriented in FIG. 2b. FIG. 2c shows another continuous, i.e. closed, loop frame composite rod 104 that crosses the three adjacent sides (top, front, and right sides), and the bottom surface of the mandrel 110, including crossing the bottom surface three times, as oriented in FIG. 2c. FIG. 2d shows another continuous or closed loop frame composite rod 104 that crosses the front, right, back, and left surfaces (the peripheral surfaces) of the mandrel 110, as oriented in FIG. 2d. FIG. 2e shows a similar frame composite rod 104 to that shown in FIG. 2c, but crossing the left surface of the mandrel instead of the right, as oriented in FIG. 2e. Those skilled in the art will readily appreciate that any suitable continuous, i.e., closed, loop pattern can be used for frame composite rods 104 without departing from the scope of this disclosure, i.e., FIGS. 2a-2e show representative examples which can be similarly extended to other mandrel shapes and/or frame rod designs.

Figure 3:
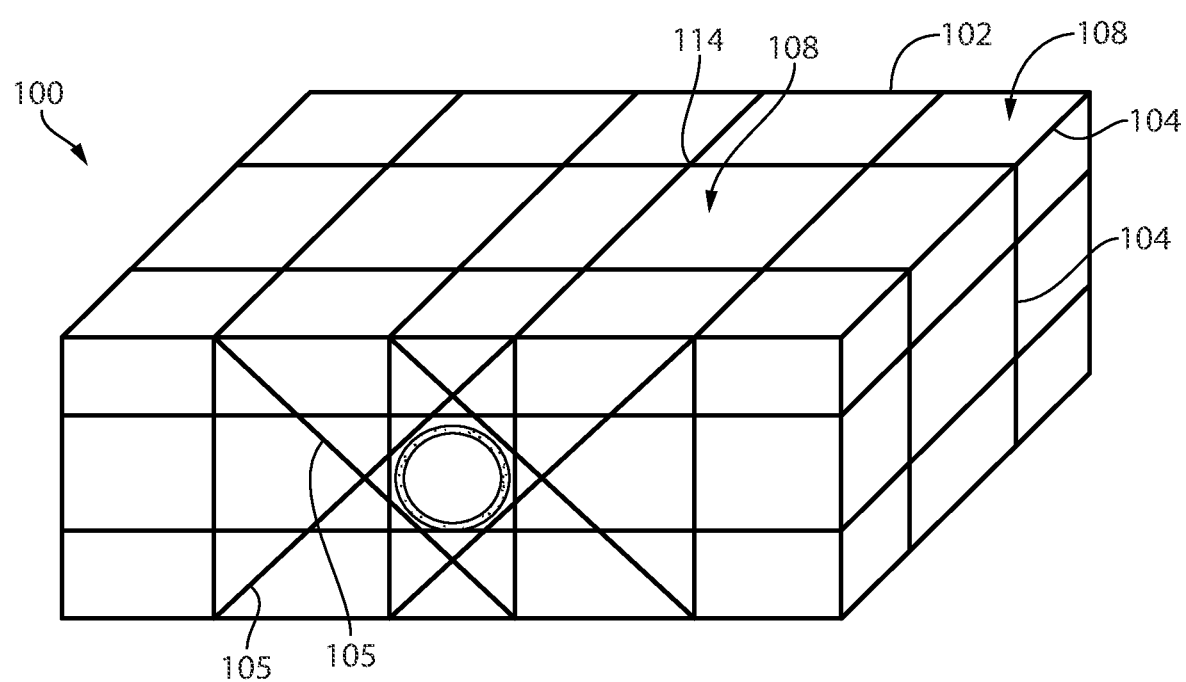
FIG. 3 is a schematic perspective view of a composite frame, showing the optical aperture in the frame.
Figure 4A:
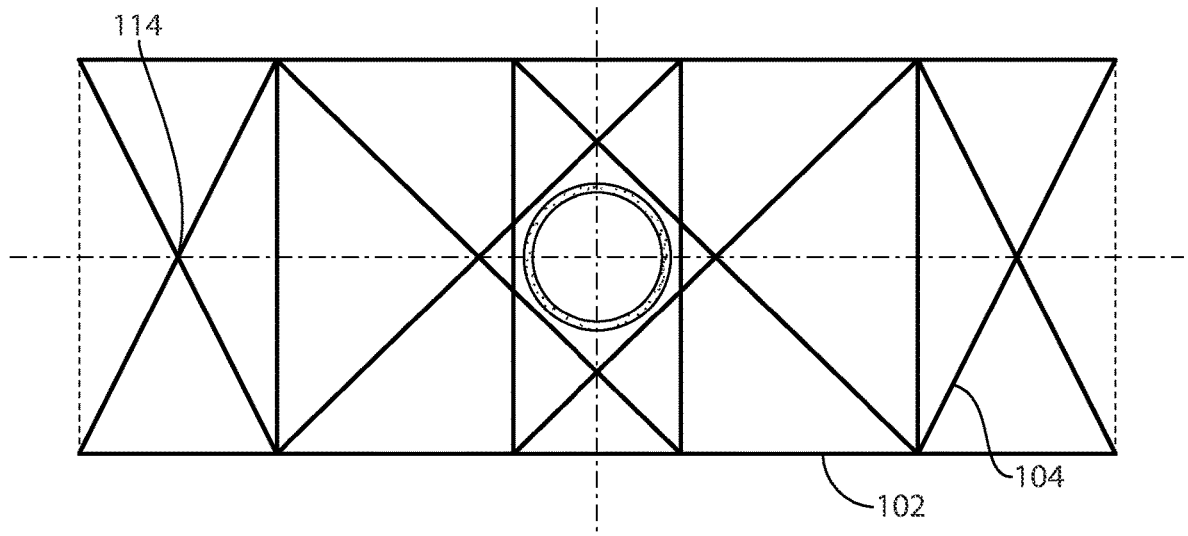
FIGS. 4*a*-4*b* are schematic front two-dimensional views of composite frames, showing examples of two different densities of composite distribution.
Figure 4B:
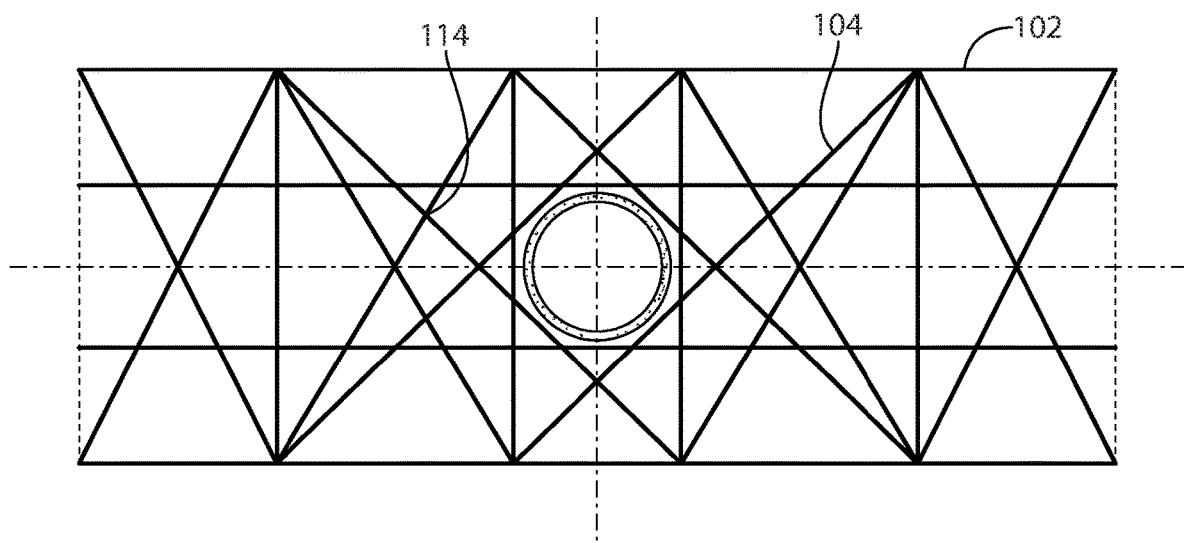

With reference now to an example of a composite frame shown in FIG. 3, the lattice 102 of frame composite rods 104 includes a plurality of continuous loop frame composite rods 104, such as those described above with reference to FIGS. 2a-2e, interconnected with the lattice 102. The lattice 102 also includes a plurality of dis-continuous or open loop frame composite rods 105 interconnected with the lattice 102. FIGS. 4a and 4b show two-dimensional side views of two lattices 102, respectively, one with a less dense lattice design, and the other with a more dense lattice design. Number and geometries of frame composite rods 104 can be used to control the lattice density and structural integrity according to specifics of a given application.

Figure 5A:
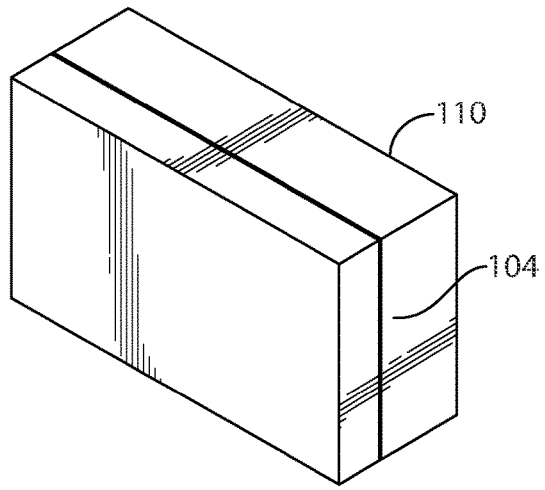
FIGS. 5a-5d are schematic perspective views of mandrels for forming composite frames, showing representative examples of different mandrel shapes.
Figure 5B:
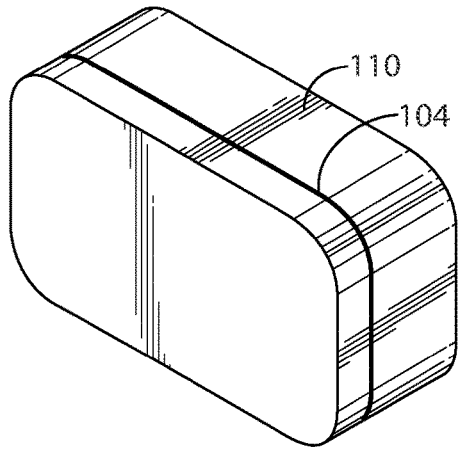
Figure 5C:
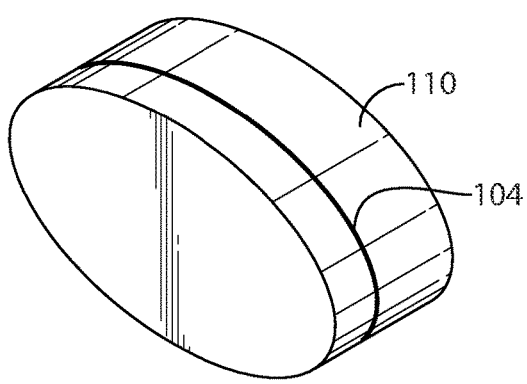
Figure 5D:
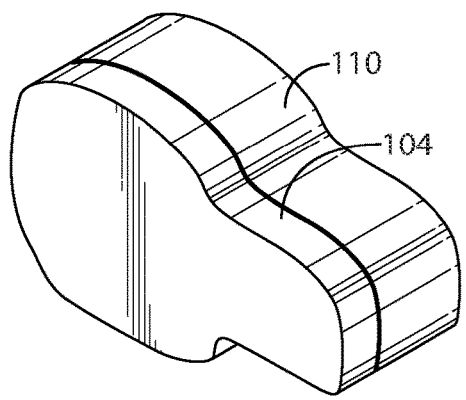

Additionally, the lattice 102 needs not to conform to a rectangular mandrel 110 or interior space 106 with rectangular cross-sections (labeled in FIG. 1). FIGS. 5a-5d show frame composite rods 104 being formed on mandrels 110 shaped with a rectangular cross-section (FIG. 5a), with a rounded corner rectangular cross-section (FIG. 5b), with an oval, or more generally, convex cross-section (FIG. 5c), and with an arbitrary cross-section including both convex and concave segments (FIG. 5d). In addition to different two-dimensional geometries of cross-sectional designs, different three-dimensional geometries of mandrels can be similarly applied. Those skilled in the art will readily appreciate that any suitable lattice structure can be used for an opto-mechanical support structure without departing from the scope of this disclosure.

Figure 6A:
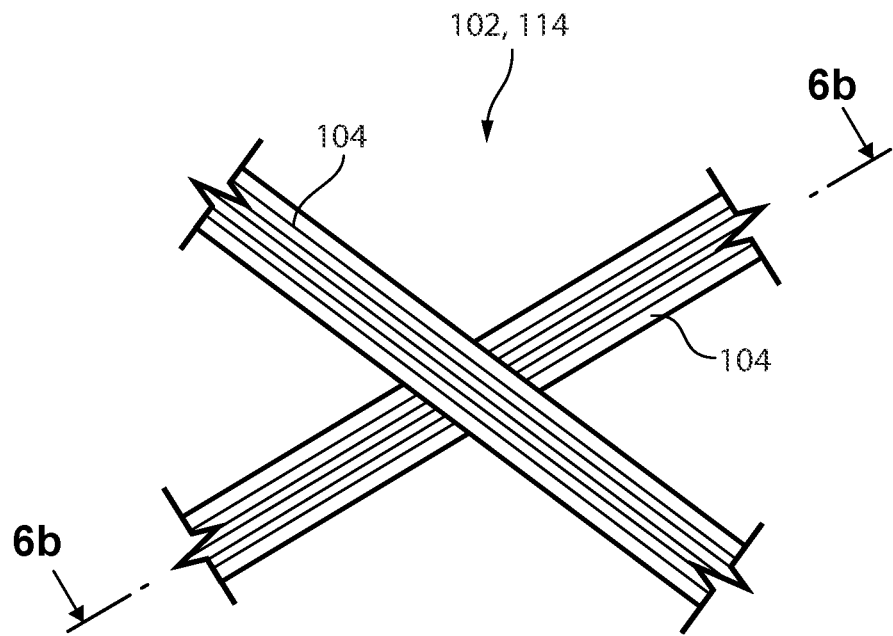
FIGS. 6a-6b are schematic in plane and cross-sectional views of an intersection of frame composite rods of FIG. 1.
Figure 6B:
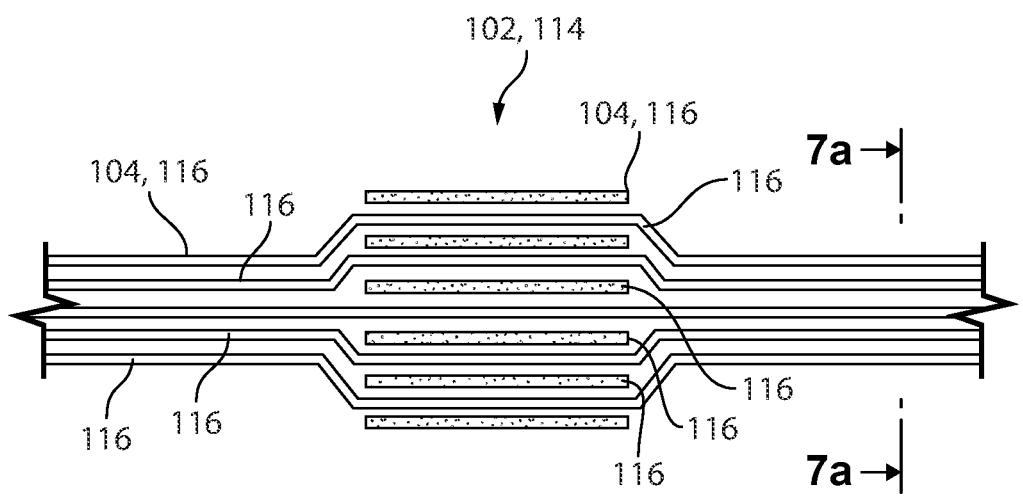

The frame composite rods 104, 105 are unidirectionally reinforced by fibers polymer-matrix composite elements, which can all be formed by an AFP arm 112, as shown in FIG. 2a. Carbon, glass and organic (e.g., Kevlar) fibers or any of their combinations can be used, among others, for the reinforcement. Thermoplastics or thermosets can be used as the polymer matrix. As shown in FIGS. 6a-6b, intersections 114 in the lattice 102 of the frame composite rods 104 include interlaying of the composite layers 116 or groups of layers 116 of the respective intersecting frame composite rods 104, formed by laying the one layer (or group of layers) at a time in the intersection stack, every other layer (or group of layers) belonging to one of the intersecting respective frame composite rods 104. The frame composite rods 104 can be formed layer by layer (or one group of layers by another group of layers), one layer (or one group of layers 116) at a time to have any suitable cross-sectional profile.

Figure 7A:
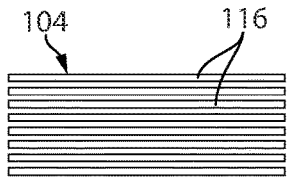
FIGS. 7a-7i are schematic cross-sectional views of different examples of cross-sectional profiles for frame composite rods.
Figure 7B:
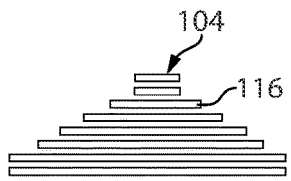
Figure 7C:
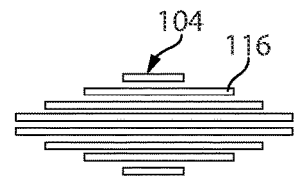
Figure 7D:
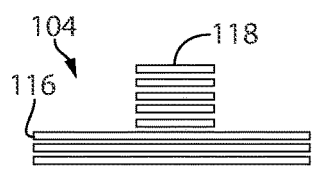
Figure 7E:
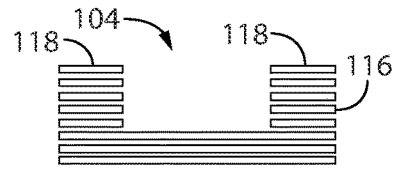
Figure 7F:
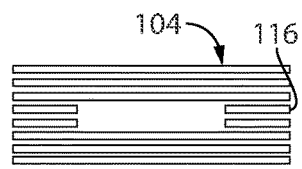
Figure 7G:
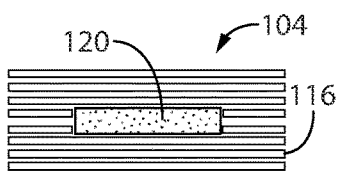
Figure 7H:
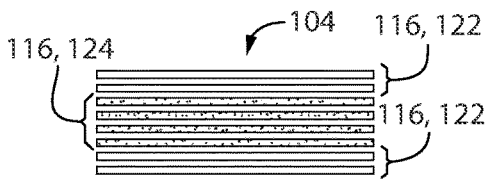
Figure 7I:
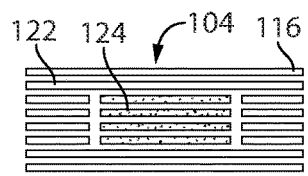

The frame composite rods 104 in FIG. 6b have rectangular, constant thickness cross-sections, shown in FIG. 7a. Any other suitable cross-sectional configuration can be used for the frame composite rods 104. FIG. 7b shows a frame composite rod 104 with a non-constant thickness where one surface of the cross-sectional profile is flat, i.e., the bottom layer 116 is flat, and the successive layers 116 upward from the bottom are successively narrower towards the top as oriented in FIG. 7b. FIG. 7c shows a non-constant thickness where opposed surfaces (i.e., the top and bottom layers 116 as oriented in FIG. 7c) are both non-flat. FIG. 7d shows a cross-sectional profile for a frame composite rod 104 with one rib 118 extending from a base, e.g., from the top or bottom layer, and FIG. 7e shows a cross-sectional profile with multiple ribs 118 extending from a base (with the base as the top layer in this example). FIG. 7f shows a cross-sectional frame composite rod profile with a hollow shape, and FIG. 7g shows one with a hollow shape having an insert 120 inside. The inserts 120 can be any suitable light-weight materials, for example, polymeric, foam, elastomeric, honeycomb, among others. The layers 116 can vary in material during the AFP process, giving a frame composite rod 104 with a cross-sectional profile having multiple different composite materials 122/124 in layers 116 varied through thickness of the cross-sectional profile, as shown in FIG. 7h. In FIG. 7i, the multiple different materials 122/124 in layers 116 are varied through thickness and width of the cross-sectional profile, as shown in FIG. 7i.

Figure 8:
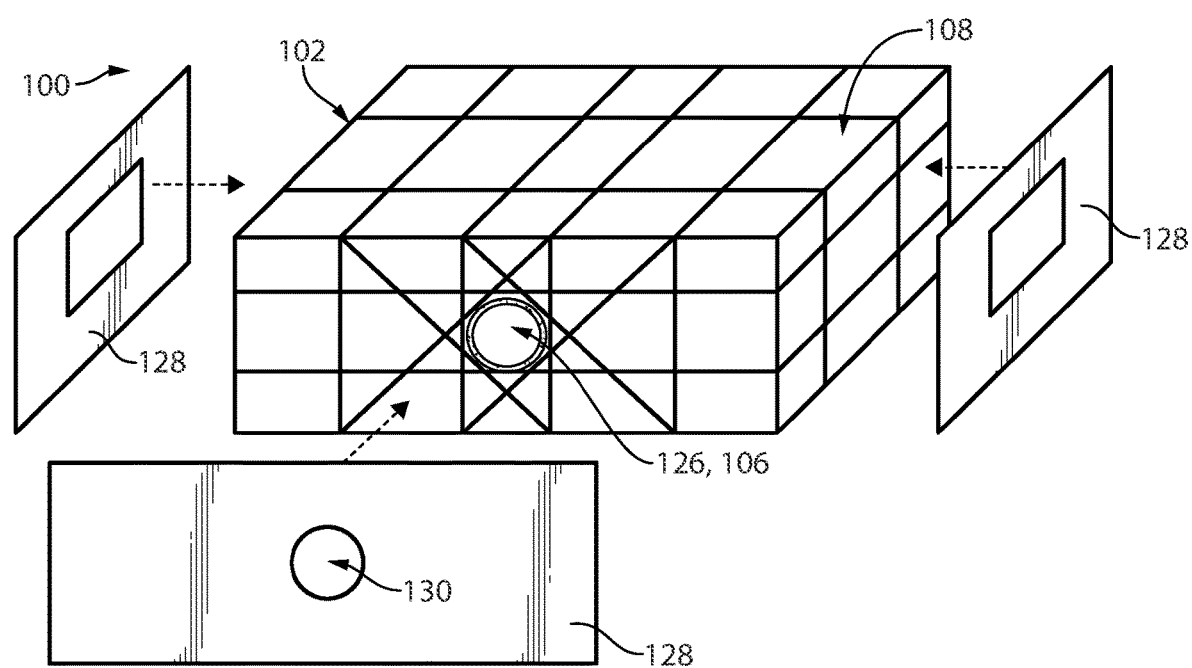
FIG. 8 is an exploded perspective view of the composite frame of FIG. 1, showing wall panels for protecting the interior space of the frame.

With reference now to FIG. 8, one of the interstices 108 defines an optics or opto-mechanical aperture 126 therethrough for admittance of image data, e.g., optical or any portion of the electromagnetic spectrum for example, through the frame 100. After forming the lattice 102, the method includes removing the mandrel 110 (labeled in FIG. 1) from an interior space 106 of the frame 100 after forming the frame 100. The mandrel 110 can be removed by dissolving or washing the mandrel 120 away after forming the frame 100. Wall panels 128, e.g., of a composite monolithic or a sandwich design, can optionally be mounted to an exterior aspect of the frame 100 for protection of the interior space 106. Such wall panels 128 can include one or more aperture 130 therethrough, e.g., aligned with the optics aperture 126 of the lattice 102. The wall panels 128 can provide protection for optics/imaging components housed inside the lattice.

Figure 9:
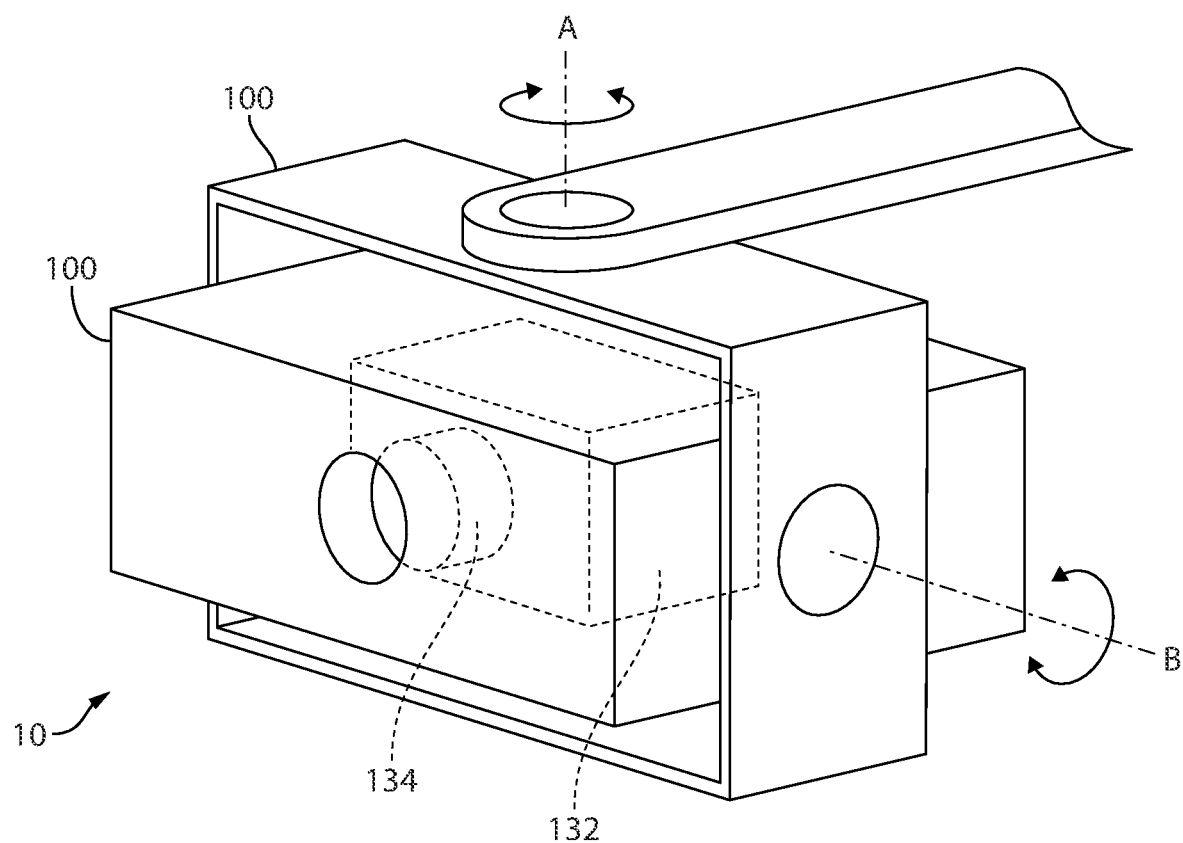
FIG. 9 is a schematic perspective view of a gimbal formed of two or more composite frames like the composite frame of FIG. 1.

An example of usage of composite frames is illustrated in FIG. 9. An optical and/or imaging assembly 132, e.g., including a camera, lens, telescope, or the like, is mounted inside the lattice 102 with an objective lens 134 aligned with the optical aperture 126 through one of the interstices 108 in the lattice 102 (labeled in FIG. 3). Two or more frames 100 constructed as disclosed herein can be connected together as a three-dimensional gimbal 10, where two axes of rotation A and B are indicated in FIG. 9.

The methods and systems of the present disclosure, as described above and shown in the drawings, provide for forming composite frames for optics systems. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A frame for an opto-mechanical support structure comprising:
    an interconnected lattice of fiber-reinforced frame composite rods defined about an interior space with interstices defined between the frame composite rods; and
    wall panels mounted to an exterior aspect of the lattice for protection of the interior space; and
    an optical-mechanical assembly with an objective lens, an entirety of which is mounted inside the lattice,
    wherein at least one of the interstices defines an optics or opto-mechanical aperture and at least one of the wall panels includes a panel aperture therethrough which is aligned with the optics or opto-mechanical aperture of the at least one of the interstices and the objective lens is aligned with the optics or opto-mechanical aperture of the at least one of the interstices from within the lattice.

2. The frame as recited in claim 1, wherein the lattice of frame composite rods includes a plurality of continuous loop frame composite rods interconnected with the lattice.

3. The frame as recited in claim 1, wherein the lattice of frame composite rods includes a plurality of dis-continuous loop frame composite rods interconnected with the lattice.

4. The frame as recited in claim 1, wherein the frame composite rods are unidirectionally fiber reinforced polymer-matrix composite elements.

5. The frame as recited in claim 4, wherein intersections of the frame composite rods include interlaying composite individual layers or groups of layers.

6. The frame as recited in claim 1, wherein at least one of the frame composite rods includes a cross-sectional profile selected from the group consisting of: constant thickness, non-constant thickness where one surface of the cross-sectional profile is flat, non-constant thickness where opposed surfaces are both non-flat, one rib extending from an external surface or base, multiple ribs extending from a base or external surface, a hollow shape, a hollow shape with an insert inside, multiple different materials in layers varied through thickness of the cross-sectional profile, and multiple different materials in layers varied through thickness and width of the cross-sectional profile.

7. The frame as recited in claim 1, wherein the at least one of the interstices defines the optics or opto-mechanical aperture for equipment used for transmission or receiving information.

8. The frame as recited in claim 1, wherein at least one of the frame composite rods forms a continuous loop that extends across more than one surface surrounding the interior space.

9. The frame as recited in claim 8, wherein the interior space is six-sided and wherein at least one of the frame composite rods forms a continuous loop that extends across all six sides of the interior space.

10. The frame as recited in claim 8, wherein the interior space is six-sided and wherein at least one of the frame composite rods forms a continuous loop that extends across three different sides of the interior space.

11. The frame as recited in claim 8, wherein the interior space is six-sided and wherein at least one of the frame composite rods forms a continuous loop that extends across four different sides of the interior space.

12. An assembly of two or more frames as recited in claim 1, wherein the two or more frames are connected together as a three-dimensional gimbal.

13. An optical and/or imaging assembly, comprising:
    an objective lens; and
    a frame for an opto-mechanical support structure comprising:
        an interconnected lattice of fiber-reinforced frame composite rods defined about an interior space in which an entirety of the objective lens in mounted with interstices defined between the frame composite rods; and
        wall panels mounted to an exterior aspect of the lattice for protection of the interior space,
    wherein at least one of the interstices defines an optics or opto-mechanical aperture, at least one of the wall panels includes a panel aperture therethrough which is aligned with the optics or opto-mechanical aperture of the at least one of the interstices and with which the objective lens is aligned from within the interior space and the frame is provided as two or more frames connected together as a three-dimensional gimbal.

* * * * *